United States Patent
King et al.

(10) Patent No.: US 10,089,814 B2
(45) Date of Patent: Oct. 2, 2018

(54) PARKING METER

(71) Applicant: IPS GROUP INC., San Diego, CA (US)

(72) Inventors: David William King, Rancho Santa Fe, CA (US); Murray David Kirby Hunter, Birchgrove (AU); Matthew James Hall, San Diego, CA (US); David Andrew Jones, Beercroft (AU)

(73) Assignee: IPS GROUP INC., San Diego, CA (US)

( * ) Notice: Subject to any disclaimer, the term of this patent is extended or adjusted under 35 U.S.C. 154(b) by 0 days.

(21) Appl. No.: 15/465,165

(22) Filed: Mar. 21, 2017

(65) Prior Publication Data

US 2017/0193734 A1    Jul. 6, 2017

Related U.S. Application Data

(63) Continuation of application No. 14/698,806, filed on Apr. 28, 2015, now Pat. No. 9,685,027, which is a (Continued)

(30) Foreign Application Priority Data

Feb. 27, 2007    (AU) ................................ 2007900999

(51) Int. Cl.
*G07F 9/10*    (2006.01)
*G07F 17/00*    (2006.01)
(Continued)

(52) U.S. Cl.
CPC .......... *G07F 17/0021* (2013.01); *G06Q 20/18* (2013.01); *G07F 9/10* (2013.01); *G07F 17/248* (2013.01)

(58) Field of Classification Search
CPC ........ G07F 9/10; G07F 17/00; G07F 17/0021; G07F 17/248; G07F 17/24; G06Q 20/18
See application file for complete search history.

(56) References Cited

U.S. PATENT DOCUMENTS 2,161,046 A    6/1939  Hitzeman
2,822,682 A *  2/1958  Sollenberger ......... G07F 17/248
                                                  220/324
(Continued)

FOREIGN PATENT DOCUMENTS

CA    2377010 A1    10/2001
CA    2363915 A1     5/2003
(Continued)

OTHER PUBLICATIONS

Cell Net Data Systems. First Wireless Monitoring of Parking Meters Results in Theft Arrests Using CellNet Data Systems Technology. PRNewswire, May 11, 1999, 2 pgs.
(Continued)

*Primary Examiner* — Mark J Beauchaine
(74) *Attorney, Agent, or Firm* — Wilson, Sonsini, Goodrich & Rosati

(57) ABSTRACT

A parking meter assembly (10) including a base (11) that is to be fixed to or embedded in a ground surface, typically adjacent the curb that which a car is to be parked. The assembly (10) also includes a parking meter (13) having a front face (17) that includes a coin slot (25) a card slot (20) and a control panel (21). The parking meter (13) further includes a rear face (27) having a window aperture (28) that provides for the transmission of light to a solar panel (29) behind the aperture (28).

8 Claims, 5 Drawing Sheets

Related U.S. Application Data continuation of application No. 14/059,260, filed on Oct. 21, 2013, now abandoned, which is a continuation of application No. 12/973,109, filed on Dec. 20, 2010, now Pat. No. 8,590,687, which is a continuation of application No. 12/072,524, filed on Feb. 27, 2008, now Pat. No. 7,854,310.

(51) Int. Cl.
*G07F 17/24* (2006.01)
*G06Q 20/18* (2012.01)

(56) References Cited

U.S. PATENT DOCUMENTS

| | | | |
|---|---|---|---|
| 2,832,506 A | 4/1958 | Hatcher | |
| 2,988,191 A | 6/1961 | Grant | |
| 3,183,411 A | 5/1965 | Palfi | |
| 3,535,870 A | 10/1970 | Mitchell | |
| 3,721,463 A | 3/1973 | Attwood et al. | |
| 3,999,372 A | 12/1976 | Welch et al. | |
| 4,043,117 A | 8/1977 | Maresca et al. | |
| 4,812,805 A | 3/1989 | Lachat et al. | |
| 4,823,928 A | 4/1989 | Speas | |
| 4,825,425 A | 4/1989 | Turner | |
| 4,875,598 A | 10/1989 | Dahl | |
| 4,880,097 A | 11/1989 | Speas | |
| 4,895,238 A * | 1/1990 | Speas | G07B 15/02 |
| | | | 194/319 |
| 5,065,156 A | 11/1991 | Bernier | |
| 5,222,076 A | 6/1993 | Ng et al. | |
| 5,244,070 A | 9/1993 | Carmen et al. | |
| 5,273,151 A | 12/1993 | Carmen et al. | |
| 5,360,095 A | 11/1994 | Speas | |
| 5,382,780 A | 1/1995 | Carmen | |
| 5,442,348 A | 8/1995 | Mushell | |
| 5,563,491 A * | 10/1996 | Tseng | B60L 11/1816 |
| | | | 194/904 |
| 5,614,892 A | 3/1997 | Ward, II et al. | |
| 5,617,942 A * | 4/1997 | Ward, II | G07F 17/248 |
| | | | 194/217 |
| 5,640,002 A | 6/1997 | Ruppert et al. | |
| 5,648,906 A | 7/1997 | Amirpanahi | |
| 5,659,306 A | 8/1997 | Bahar | |
| 5,710,743 A | 1/1998 | Dee et al. | |
| 5,737,710 A | 4/1998 | Anthonyson | |
| 5,778,067 A | 7/1998 | Jones et al. | |
| 5,806,651 A | 9/1998 | Carmen et al. | |
| 5,833,042 A | 11/1998 | Baitch et al. | |
| 5,841,369 A | 11/1998 | Sutton et al. | |
| 5,842,411 A | 12/1998 | Johnson | |
| 5,845,268 A | 12/1998 | Moore | |
| 5,852,411 A | 12/1998 | Jacobs et al. | |
| 5,954,182 A | 9/1999 | Wei | |
| 6,037,880 A | 3/2000 | Manion | |
| 6,078,272 A | 6/2000 | Jacobs et al. | |
| 6,081,205 A | 6/2000 | Williams | |
| 6,111,522 A | 8/2000 | Hiltz et al. | |
| 6,116,403 A | 9/2000 | Kiehl | |
| 6,195,015 B1 | 2/2001 | Jacobs et al. | |
| 6,229,455 B1 | 5/2001 | Yost et al. | |
| 6,230,868 B1 | 5/2001 | Tuxen et al. | |
| 6,309,098 B1 | 10/2001 | Wong | |
| 6,312,152 B2 | 11/2001 | Dee et al. | |
| RE37,531 E | 1/2002 | Chaco et al. | |
| 6,373,422 B1 | 4/2002 | Mostafa | |
| 6,373,442 B1 | 4/2002 | Thomas et al. | |
| 6,456,491 B1 | 9/2002 | Flannery et al. | |
| 6,457,586 B2 | 10/2002 | Yasuda et al. | |
| 6,505,774 B1 | 1/2003 | Fulcher et al. | |
| 6,697,730 B2 | 2/2004 | Dickerson | |
| 6,747,575 B2 | 6/2004 | Chauvin et al. | |
| 6,856,922 B1 | 2/2005 | Austin et al. | |
| 6,914,411 B2 | 7/2005 | Couch et al. | |
| 6,929,179 B2 | 8/2005 | Fulcher et al. | |
| 7,019,420 B2 | 3/2006 | Kogan et al. | |
| 7,019,670 B2 | 3/2006 | Bahar | |
| 7,027,773 B1 | 4/2006 | McMillin | |
| 7,183,999 B2 | 2/2007 | Matthews et al. | |
| 7,222,031 B2 | 5/2007 | Heatley | |
| 7,237,716 B2 | 7/2007 | Silberberg | |
| 7,388,349 B2 | 6/2008 | Elder et al. | |
| 7,748,620 B2 * | 7/2010 | Gomez | G06Q 20/00 |
| | | | 235/380 |
| 7,772,720 B2 | 8/2010 | McGee et al. | |
| 7,780,072 B1 | 8/2010 | Lute et al. | |
| 7,806,248 B2 | 10/2010 | Hunter et al. | |
| 7,854,310 B2 | 12/2010 | King et al. | |
| 7,855,661 B2 | 12/2010 | Ponert | |
| 7,933,841 B2 | 4/2011 | Schmeyer et al. | |
| 8,138,950 B1 | 3/2012 | Leung | |
| 8,395,532 B2 | 3/2013 | Chauvin et al. | |
| 8,479,909 B2 | 7/2013 | King et al. | |
| 8,513,832 B2 | 8/2013 | Hunter et al. | |
| 8,566,159 B2 | 10/2013 | King et al. | |
| 8,590,687 B2 | 11/2013 | King et al. | |
| 8,595,054 B2 | 11/2013 | King et al. | |
| 8,684,158 B2 | 4/2014 | Jones et al. | |
| 8,749,403 B2 | 6/2014 | King et al. | |
| 8,862,494 B2 | 10/2014 | King et al. | |
| 9,002,723 B2 | 4/2015 | King et al. | |
| 9,047,712 B2 | 6/2015 | King et al. | |
| 9,127,964 B2 | 9/2015 | Schwarz et al. | |
| 9,391,474 B2 | 7/2016 | Hunter et al. | |
| 9,424,691 B2 | 8/2016 | King et al. | |
| 2001/0012241 A1 | 8/2001 | Dee et al. | |
| 2001/0047278 A1 | 11/2001 | Brookner et al. | |
| 2001/0051531 A1 | 12/2001 | Singhal et al. | |
| 2002/0008639 A1 | 1/2002 | Dee | |
| 2002/0111768 A1 | 8/2002 | Ghorayeb et al. | |
| 2003/0092387 A1 | 5/2003 | Hjelmvik | |
| 2003/0112151 A1 | 6/2003 | Chauvin et al. | |
| 2003/0112597 A1 | 6/2003 | Smith | |
| 2003/0121754 A1 | 7/2003 | King | |
| 2003/0128010 A1 | 7/2003 | Hsu | |
| 2003/0128136 A1 | 7/2003 | Spier et al. | |
| 2003/0132840 A1 | 7/2003 | Bahar | |
| 2003/0140531 A1 | 7/2003 | Pippins | |
| 2003/0144972 A1 | 7/2003 | Cordery et al. | |
| 2003/0169183 A1 | 9/2003 | Korepanov et al. | |
| 2003/0179107 A1 | 9/2003 | Kibria et al. | |
| 2003/0220835 A1 | 11/2003 | Barnes et al. | |
| 2003/0222792 A1 | 12/2003 | Berman et al. | |
| 2004/0068434 A1 | 4/2004 | Kanekon | |
| 2004/0084278 A1 | 5/2004 | Harris et al. | |
| 2004/0094619 A1 | 5/2004 | Silberberg | |
| 2004/0181496 A1 | 9/2004 | Odinotski et al. | |
| 2004/0264302 A1 | 12/2004 | Ward | |
| 2005/0040951 A1 * | 2/2005 | Zalewski | G06Q 10/02 |
| | | | 340/572.1 |
| 2005/0178639 A1 | 8/2005 | Brumfield et al. | |
| 2005/0192911 A1 | 9/2005 | Mattern | |
| 2006/0021848 A1 | 2/2006 | Smith | |
| 2006/0116972 A1 | 6/2006 | Wong | |
| 2006/0149684 A1 | 7/2006 | Matsuura et al. | |
| 2006/0152349 A1 | 7/2006 | Ratnakar | |
| 2006/0267799 A1 | 11/2006 | Mendelson | |
| 2007/0016539 A1 | 1/2007 | Groft et al. | |
| 2007/0094153 A1 | 4/2007 | Ferraro | |
| 2007/0114849 A1 | 5/2007 | Falik et al. | |
| 2007/0119682 A1 | 5/2007 | Banks et al. | |
| 2007/0136128 A1 | 6/2007 | Janacek et al. | |
| 2007/0184852 A1 | 8/2007 | Johnson et al. | |
| 2007/0210935 A1 | 9/2007 | Yost et al. | |
| 2007/0285281 A1 | 12/2007 | Welch et al. | |
| 2008/0071611 A1 | 3/2008 | Lovett | |
| 2008/0093454 A1 | 4/2008 | Yamazaki et al. | |
| 2008/0147268 A1 | 6/2008 | Fuller | |
| 2008/0208680 A1 | 8/2008 | Cho | |
| 2008/0238715 A1 | 10/2008 | Cheng et al. | |
| 2009/0109062 A1 | 4/2009 | An | |
| 2009/0192950 A1 | 7/2009 | King et al. | |
| 2009/0267732 A1 | 10/2009 | Chauvin et al. | |
| 2009/0284907 A1 | 11/2009 | Regimbal et al. | |

(56) References Cited

U.S. PATENT DOCUMENTS

| | | |
|---|---|---|
| 2009/0315720 A1 | 12/2009 | Clement et al. |
| 2010/0106517 A1 | 4/2010 | Kociubinski et al. |
| 2010/0188932 A1 | 7/2010 | Hanks et al. |
| 2011/0313822 A1 | 12/2011 | Burdick |
| 2012/0222935 A1 | 9/2012 | Mackay et al. |
| 2012/0285790 A1 | 11/2012 | Jones et al. |
| 2012/0285792 A1 | 11/2012 | Jones et al. |
| 2012/0292385 A1 | 11/2012 | Mackay et al. |
| 2013/0005445 A1 | 1/2013 | Walker et al. |
| 2013/0027218 A1 | 1/2013 | Schwarz et al. |
| 2014/0040028 A1 | 2/2014 | King et al. |
| 2014/0108107 A1 | 4/2014 | Jones et al. |
| 2014/0174881 A1 | 6/2014 | King et al. |
| 2014/0289025 A1 | 9/2014 | King et al. |
| 2015/0084786 A1 | 3/2015 | King et al. |
| 2015/0106172 A1 | 4/2015 | Salama |
| 2015/0235503 A1 | 8/2015 | King et al. |
| 2015/0332587 A1 | 11/2015 | Schwarz et al. |
| 2016/0012418 A1 | 1/2016 | Mackay et al. |
| 2018/0082488 A1 | 3/2018 | Q |
| 2018/0082489 A1 | 3/2018 | Q |
| 2018/0082490 A1 | 3/2018 | Q |

FOREIGN PATENT DOCUMENTS

| | | |
|---|---|---|
| EP | 0329129 A2 | 8/1989 |
| EP | 0980055 B1 | 9/2001 |
| FR | 2837583 A1 | 9/2003 |
| JP | 2002099640 A | 4/2002 |
| JP | 2005267430 A | 9/2005 |
| KR | 20050038077 A | 4/2005 |
| WO | WO-2005031494 A2 | 4/2005 |
| WO | WO-2006095352 A2 | 9/2006 |
| WO | WO-2009154787 A2 | 12/2009 |

OTHER PUBLICATIONS

Decision Denying Institution of Inter Partes Review dated Mar. 30, 2016 of U.S. Pat. No. 7,854,310. IPR Case No. IPR2016-00068.
Decision Denying Inter Partes Review dated Apr. 1, 2016 of U.S. Pat. No. 8,595,054. IPR Case No. IPR2016-00069. 1:1.
Decision Denying Inter Partes Review dated Apr. 1, 2016 of U.S. Pat. No. 8,595,054. IPR Case No. IPR2016-00070.
Decision Instituting Inter Partes Review dated Mar. 30, 2016 of U.S. Pat. No. 7,854,310. IPR Case No. IPR2016-00067.
Fidelman. Time's Running Out for Parking Meters at Present Locations: $270,000 Cited as Replacement Cost. City Employees Who Ticket Motorists Find Electronic Meters Unsuitable. The Gazette, Final Edition, Montreal, Quebec, Canada, Nov. 12, 2002, p. A7.
Flatley. In San Francisco, Hackers Park for Free. Read filed under Misc. Gadgets, downloaded from www.engadget.com website on May 3, 2010, originally posted on Jul. 31, 2009, 5 pages.
Howland. How M2M Maximizes Denver's Revenue. Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001.
Meter Solutions, Single-Space Meters brochure, downloaded from www.duncansolutions.com website, revised Apr. 2006, 2 pages.
PCT/IB2006/054574 International Preliminary Report on Patentability dated Mar. 10, 2009.
PCT/IB2006/054574 International Search Report dated Oct. 27, 2008.
PCT/US2010/047906 International Preliminary Report on Patentability dated Mar. 6, 2012.
PCT/US2010/047906 International Search Report dated Mar. 30, 2011.
PCT/US2010/047907 International Preliminary Report on Patentability dated Mar. 15, 2012.
PCT/US2010/047907 International Search Report dated Apr. 26, 2011.
PCT/US2012/048190 International Search Report dated Jan. 22, 2013.
Petition for Inter Partes Review of U.S. Pat. No. 7,854,310. IPR Case No. IPR2016-00067, filed Oct. 22, 2015.
Petition for Inter Partes Review of U.S. Pat. No. 7,854,310. IPR Case No. IPR2016-00068, filed Oct. 22, 2015.
Petition for Inter Partes Review of U.S. Pat. No. 8,595,054. IPR Case No. IPR2016-00069, filed Oct. 22, 2015.
Petition for Inter Partes Review of U.S. Pat. No. 8,595,054. IPR Case No. IPR2016-00070, filed Oct. 22, 2015.
Spyker et al. Predicting Capacitor Run Time for a Battery/Capacitor Hybrid Source. Power Electronic Drives and Energy Systems for Industrial Growth. 1998. Proceedings. 1998 IEEE International Conference, pp. 809-814.
Tung. Design of an advanced on-street parking meter. RIT Scholar Works. Thesis/Dissertation Collections (2001).
Final Written Decision of U.S. Pat. No. 7,854,310. IPR Case No. IPR2016-00067 dated Mar. 27, 2017, (19 pages).

* cited by examiner

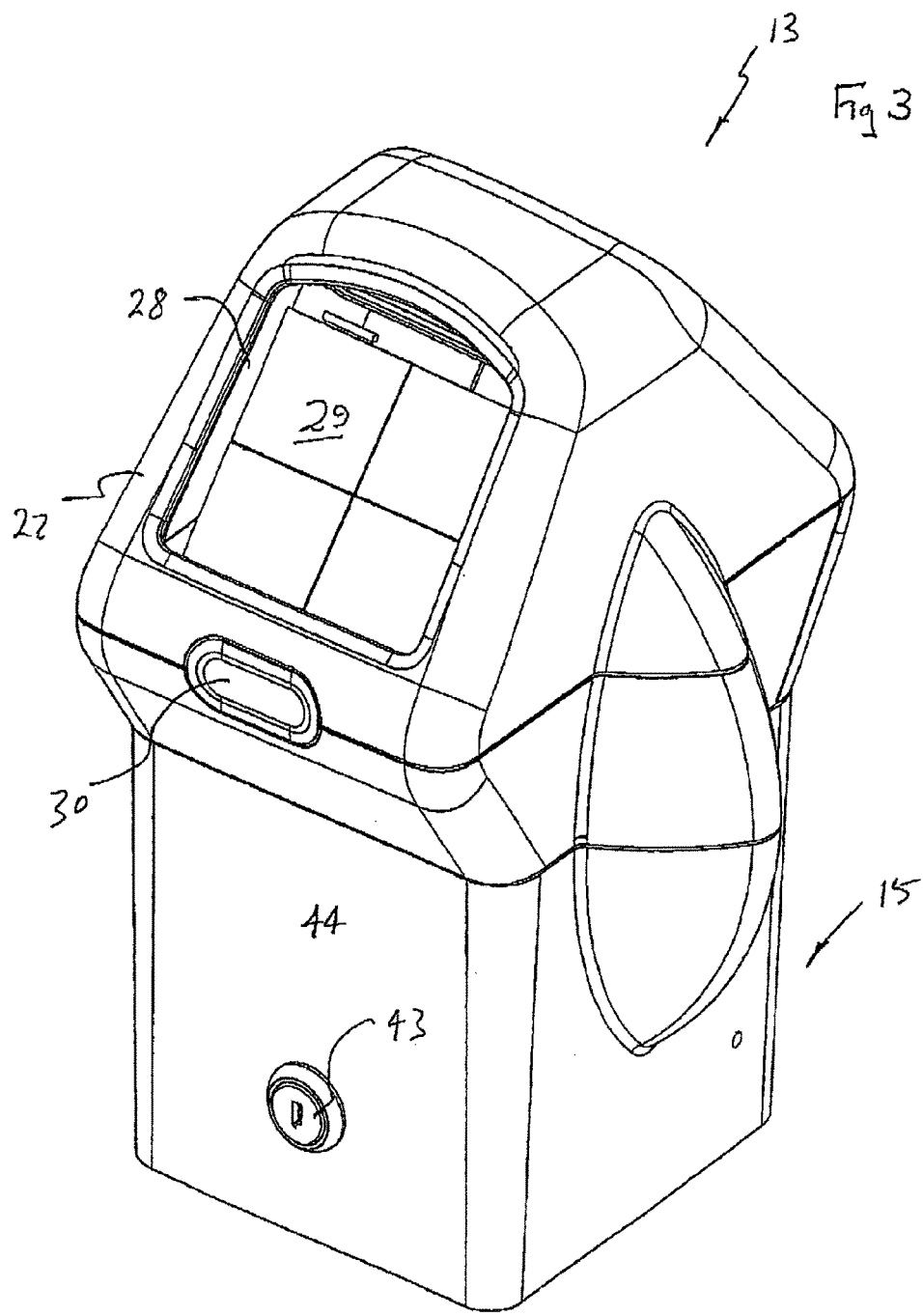

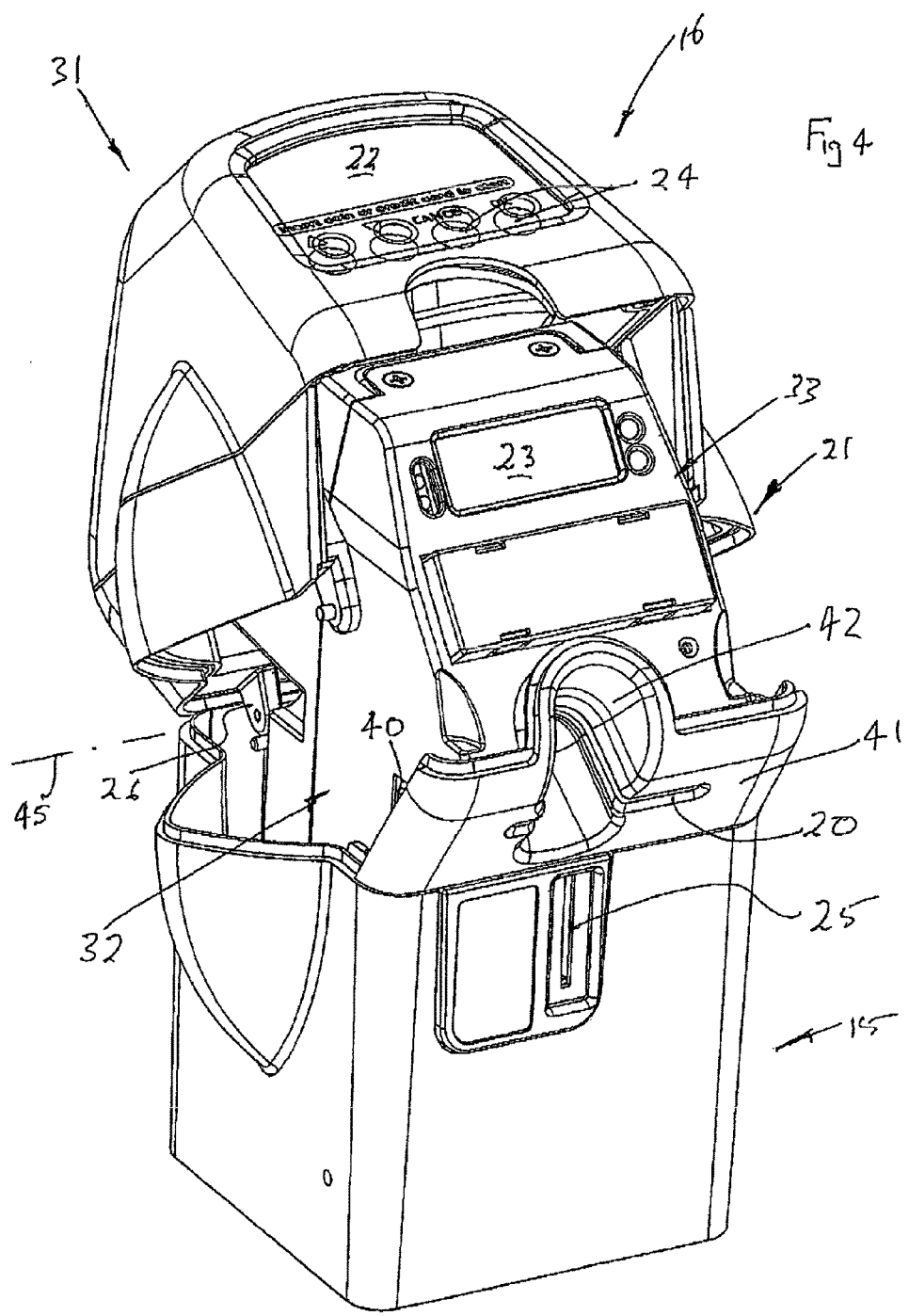

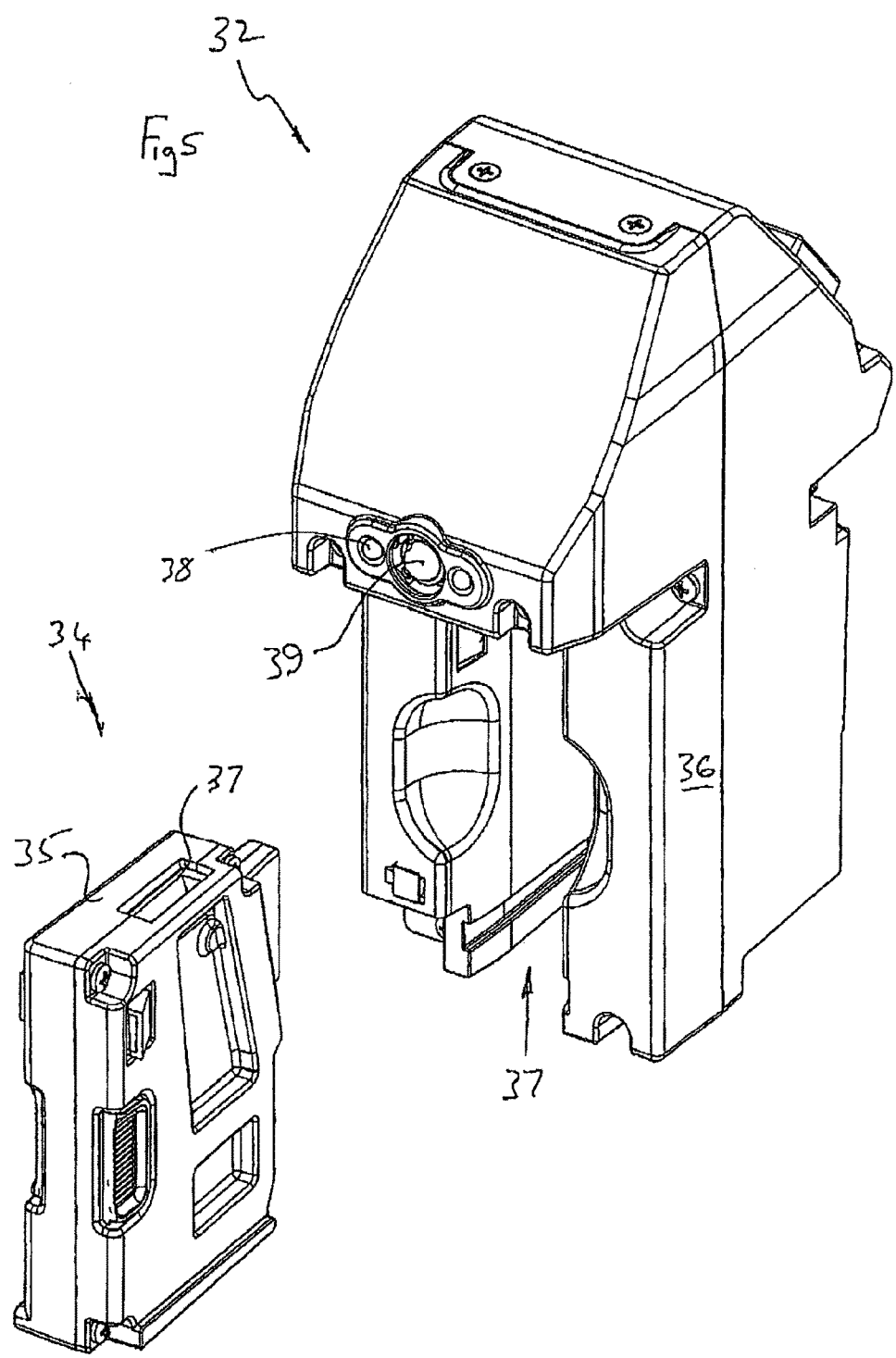

PARKING METER

CROSS-REFERENCES TO RELATED APPLICATIONS

This application is a continuation of U.S. patent application Ser. No. 14/698,806, filed Apr. 28, 2015, which is a continuation of U.S. patent application Ser. No. 14/059,260, filed Oct. 21, 2013, which is a continuation application of U.S. patent application Ser. No. 12/973,109, filed Dec. 20, 2010, now U.S. Pat. No. 8,590,687, issued Nov. 26, 2013, which is a continuation of U.S. patent application Ser. No. 12/072,524, filed Feb. 27, 2008, now U.S. Pat. No. 7,854,310, issued Dec. 21, 2010, which claims priority to Australian Patent Application 2007900999, filed Feb. 27, 2007. The disclosures of these applications are hereby incorporated by reference, as if set forth in full in this document, for all purposes.

TECHNICAL FIELD

The present invention relates to parking meters and more particularly to electrically powered parking meters.

BACKGROUND OF THE INVENTION

Parking meters initially were coin operated. They were known to consist of a module to be fixed to a post having a lower end embedded in a ground surface typically adjacent a kerb adjacent which vehicles were to be parked. The parking meters were operated by inserting a coin and then turning a knob to activate a "clock" mechanism. When a certain period had expired, the parking meter would display a sign indicating the parking period had expired.

The above mentioned parking meters had a number of disadvantages including complexity of the working mechanisms, unreliability in respect of coins jamming and not being well adapted to provide a range of parking times and costs in respect thereof. A still further disadvantage is that they were restricted to coin operation.

OBJECT OF THE INVENTION

It is the object of the present invention to overcome or substantially ameliorate at least one of the above disadvantages.

SUMMARY OF THE INVENTION

There is disclosed herein a parking meter including:
a coin sensor;
a card reader;
an electronic device electrically connected to the sensor and reader so as to receive information electronically therefrom, a display to provide information visually, a telephone connection to provide receiving information in respect of a card used in respect of said card reader, and connections for at least one rechargeable battery to power the reader, sensor and device; and
a solar cell operatively associated with said connections to charge said battery;
a body having;
a front face having a coin slot into which coins are inserted for delivery to the sensor and then the coin storage facility;
a card slot into which a card is inserted to be read by said reader, and a rear face providing a window via which said solar cell is exposed to light, and providing visual access to said display.

Preferably, said meter includes an indicator to provide an indication whether a parking period has expired.

Preferably, said indicator is adjacent or at said rear face.

Preferably, said meter is adapted to be fixed to a post fixed to a ground surface, with said body including a set of panels to be fixed relative to said post, and a cover panel pivotally attached to the panel set for pivoting movement about a generally horizontal axis between a closed position and an open position.

Preferably, said meter includes controls at said front face via which a user can operate the parking meter.

Preferably, said coin sensor, said card reader, said device and said control panel are a module removable as an assembly from within said body.

Preferably, said module includes a body, and said coin sensor is a coin validator unit removably located in said body.

Preferably, said telephone is a mobile (cellular) telephone.

Preferably, said front face and rear face converge upwardly.

BRIEF DESCRIPTION OF THE DRAWINGS

A preferred form of the present invention will now be described by way of example with reference to the accompanying drawings wherein:

FIG. 3 is a schematic rear isometric view of the parking meter of FIG. 2;

FIG. 4 is a schematic front isometric view of the parking meter of FIG. 2 with a top panel pivoted to an open position; and FIG. 5 is a schematic rear isometric view of a module of the parking meter of FIG. 2.

DETAILED DESCRIPTION OF THE PREFERRED EMBODIMENT

Figure 1:
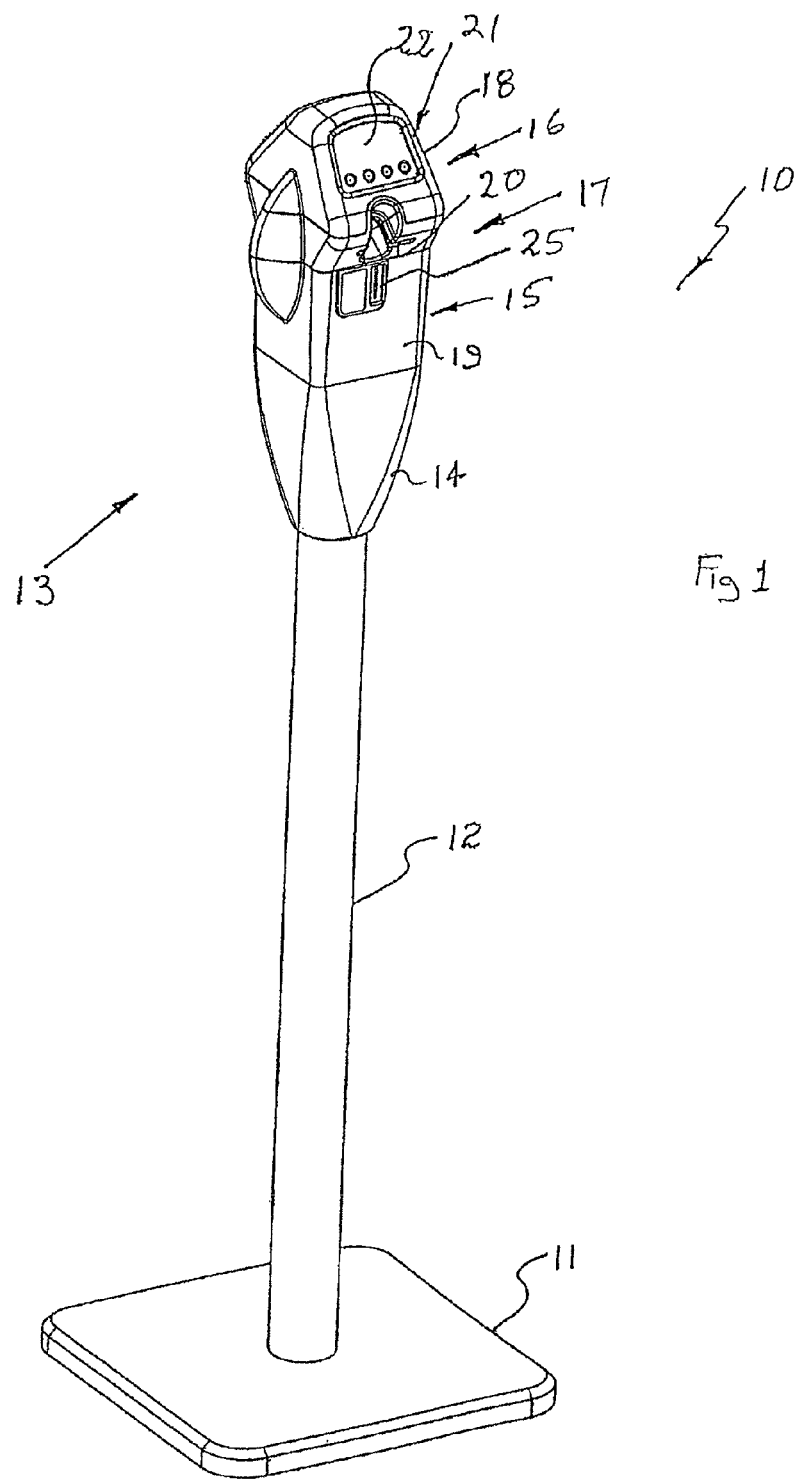
FIG. 1 is a schematic isometric view of a parking meter assembly.

In the accompanying drawings there is schematically depicted a parking meter assembly 10. The assembly 10 includes a base 11 that would be fixed to or embedded in a ground surface, typically adjacent the kerb at which a car is to be parked. Attached to the base and extending upwardly therefrom is a post 12 to the upper end of which there is attached a parking meter 13. The parking meter 13 includes a lower skirt 14 that is to be fixed to the post 12, an intermediate panel set 15, and a cover panel 16 pivotally mounted relative to the panel set 15. The cover panel 16 and panel set 15 provide a front face 17 having front face portions 18 and 19. The front face 17 includes a coin slot 25, a card slot 20 and a control panel 21. The control panel 21 includes a window 22, and buttons 24 that are manipulated by a user to operate the parking meter 13. The window 22 provides a user with means of viewing a screen 23 via which information is conveyed to the user. The information typically would include date, time and when the parking period is to expire and perhaps further information such as when the parking meter 13 is operable, information in respect of card use and cost.

Figure 2:
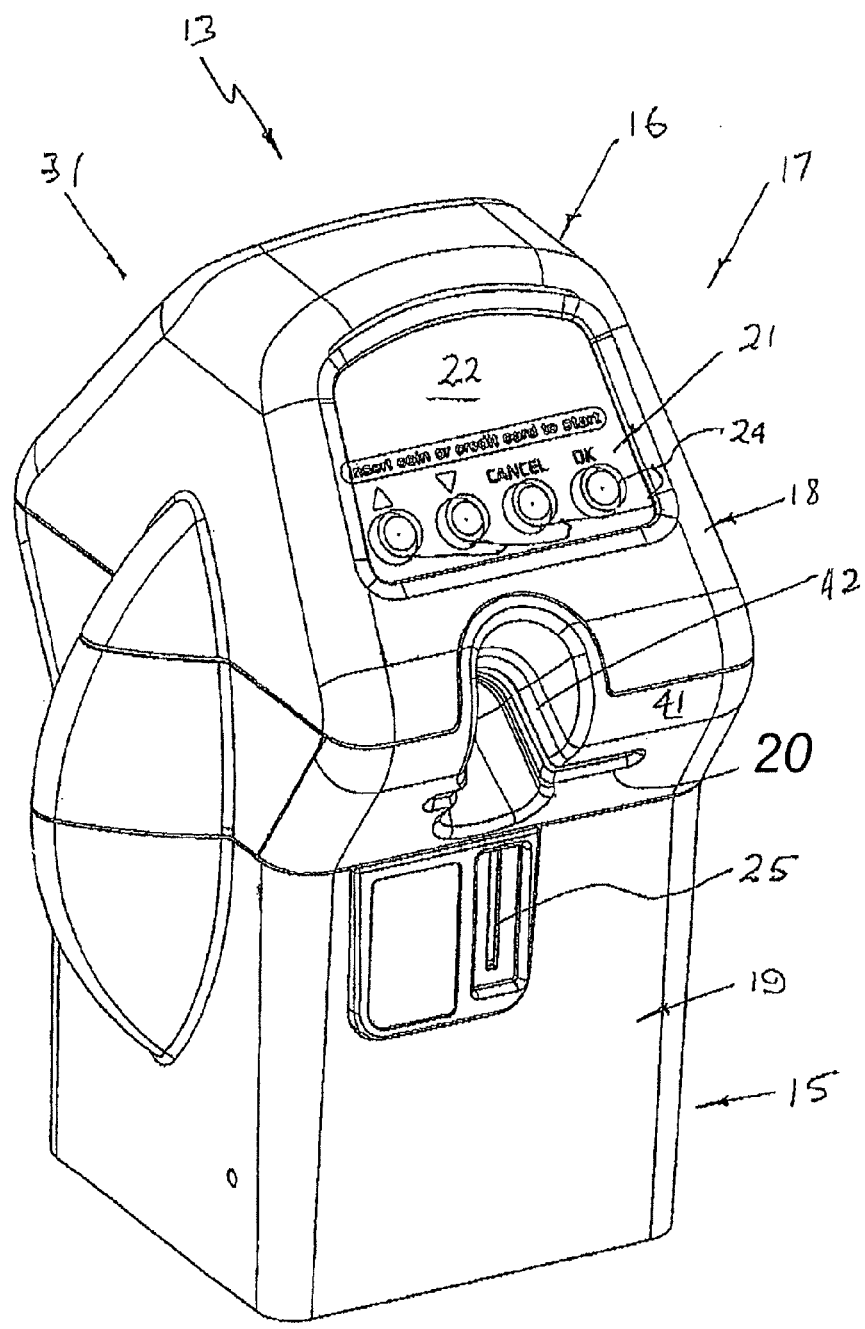
FIG. 2 is a schematic front isometric view of a parking meter employed in the assembly of FIG. 1.

The cover panel 16 is pivotally attached to the panel set 15 by means of a pivot 26 providing a generally horizontal pivot axis 45 that is generally normal to the post 12. The cover panel 16 is pivotally movable through an acute angle from the closed position as shown in FIGS. 1 and 2, to the open position shown in FIG. 4. In an alternative form, the panel 16 may be slidably attached.

The rear of the parking meter 13 includes a rear face 27 as part of the cover panel 16. The rear face 27 includes a window aperture 28 that receives a panel that provides for the transmission of light to a solar panel 29. The front face portion 18 and rear face 27 converge upwardly so that they are both inclined by acute angles to the horizontal.

At or adjacent the rear face 27 is an indicator 30 that can be viewed easily by a parking ranger moving past the meter 10, the indicator 30 providing an indication in respect of whether a parking period has expired.

When mounted adjacent a kerb separating a footpath from a roadway, the rear face 27 would face the adjacent roadway and the front face 17 away from the roadway so that a user would be standing on the footpath and facing their vehicle when operating the meter 13.

The panel set 15 and cover panel 16 provide a housing 31 within which a module 32 is located. The module 32 includes an electronic device 33 that incorporates the screen 23. The module 32 particularly includes a coin sensor 34 in the form of a coin validator 35. The coin validator 35 is received within a slot 37 of the body 36 of the module 32. Typically the coin validator 35 would provide a passage 37 through which coins would move to be "counted" and validated for the purposes of the coin validator 35 providing a signal in respect of whether appropriate coins have been delivered to the slot 25. Accordingly, the passage 37 would communicate with the slot 25 so as to receive coins therefrom. Once passing through the coin validator 35, the coins are delivered to a coin receptacle than can be cleared. The coin receptacle is located behind the skirt 14 which preferably has a door to provide for access to the coin receptacle. The coin validator 35 is provided as a unit and is removable from the module 32, when the module 32 is removed from within the housing 31.

The module 32 is also provided with a light (LED) 38 and/or colour disk 39 that are operated to provide an indication in respect of whether a parking period has expired. The light 38 and/or disk 39 are part of the indicator 30 and can be seen by the parking ranger. Typically the disk 39 would be pivotally mounted and would be "flipped" to be black or red, the red indicating that a parking period has expired.

Located immediately behind the slot 20 is a card reader 40 that would read the magnetic strip (or other information providing device) on a credit or debit card.

The coin validator 35 and card reader 40 are electrically linked to the control panel 21 to provide information therefore in respect of whether payment has been made.

Preferably, the device 33 would include a mobile (cellular) phone link so that information may be conveyed and received in respect of a credit or debit card read by the card reader 40. The device 33 may also include a power supply (battery), an IR port and LED status indicators.

Preferably, the slot 20 is located in a plane that is inclined to the horizontal by an acute angle so that the slot 20 slopes downwardly to an inclined surface 41 being part of the front face 17. The surface 41 is downwardly facing so as to protect the slot 20 from water penetration. The surface 41 is also provided with a recess 42 enabling a user's fingers to hold the card while "swiping" card through the slot 20.

A key operated lock 43 is located in a rear panel 44 of the panel set 15, the lock 43 being operable to release the cover panel 16 when appropriate key is used.

What is claimed is:

1. A parking meter including:
   a housing defining an interior;
   a cover configured to moveably attach to the housing by an attachment element requiring a sliding motion and a pivoting motion to attach the cover to the housing, the cover comprising a first window;
   an electronic device configured to be removably received by the housing, the electronic device comprising:
      a card reader that reads a card for making payment;
      a screen to provide information visually;
      a communication connection to provide information for a card used to make payment via said card reader;
      connections for at least one rechargeable battery; and
      a solar cell operatively associated with said connections to charge said battery;
   wherein the screen of the electronic device is visible through the first window of the cover panel when the electronic device is received by the housing.

2. The parking meter of claim 1, wherein said meter includes an indicator to provide an indication whether a parking period has expired.

3. The parking meter of claim 2, wherein said indicator is adjacent or at said rear face.

4. The parking meter of claim 1, wherein said meter is adapted to be fixed to a post fixed to a ground surface, with an intermediate panel set comprising a set of panels to be fixed relative to said post.

5. The parking meter of claim 1, wherein said card reader, said electronic device and said screen are a module removable as an assembly from within said housing.

6. The parking meter of claim 1, wherein said communication connection is a mobile (cellular) telephone connection.

7. The parking meter of claim 1, further including a second window which said solar cell is exposed to light.

8. The parking meter of claim 1, wherein said card reader slopes downwardly.

* * * * *